(12) United States Patent  (10) Patent No.: US 8,994,695 B2
King et al.  (45) Date of Patent: *Mar. 31, 2015

(54) METHODS AND APPARATUS FOR SENSING TOUCH EVENTS ON A DISPLAY

(71) Applicant: Corning Incorporated, Corning, NY (US)

(72) Inventors: Jeffrey Stapleton King, Menlo Park, CA (US); Mathieu Charbonneau-Lefort, San Jose, CA (US); Timothy James Orsley, San Jose, CA (US); William Richard Trutna, Atherton, CA (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/856,544

(22) Filed: Apr. 4, 2013

(65) Prior Publication Data

US 2014/0139493 A1 May 22, 2014

Related U.S. Application Data

(63) Continuation of application No. 12/625,882, filed on Nov. 25, 2009, now Pat. No. 8,436,833.

(51) Int. Cl.
G06F 3/042 (2006.01)

(52) U.S. Cl.
CPC .................................. *G06F 3/0421* (2013.01)
USPC .......................................... 345/176; 345/175

(58) Field of Classification Search
None
See application file for complete search history.

(56) References Cited

U.S. PATENT DOCUMENTS

| | | | | |
|---|---|---|---|---|
| 4,346,376 A | * | 8/1982 | Mallos | 345/176 |
| 4,484,179 A | * | 11/1984 | Kasday | 345/176 |
| 5,004,913 A | | 4/1991 | Kleinerman | |
| 7,298,367 B2 | * | 11/2007 | Geaghan et al. | 345/180 |
| 7,705,835 B2 | * | 4/2010 | Eikman | 345/176 |
| 8,218,154 B2 | | 7/2012 | Østergaard et al. | 356/614 |
| 8,803,848 B2 | | 8/2014 | Suarez Rovere | 345/176 |
| 2005/0191062 A1 | | 9/2005 | Rafferty et al. | |
| 2005/0248540 A1 | | 11/2005 | Newton | |
| 2006/0158437 A1 | * | 7/2006 | Blythe et al. | 345/173 |

(Continued)

FOREIGN PATENT DOCUMENTS

| | | |
|---|---|---|
| EP | 1288848 | 3/2003 |
| GB | 2409515 | 6/2005 |

(Continued)

OTHER PUBLICATIONS http://dl.dropbox.com/u/56644/MRS_RobertKoeppe.ppt, 2009.

(Continued)

*Primary Examiner* — Jason Olson

(74) *Attorney, Agent, or Firm* — Jason A. Barron

(57) ABSTRACT

Methods and apparatus provide for a touch sensitive display, in which a transparent layer is disposed over a display layer; light is directed to propagate into and/or through the transparent layer; scattered light is measured in response to an object touching a surface the transparent layer and disturbing the propagation of the light therethrough; and one or more positions at which the object touches the transparent layer are computed based on signals obtained by the step of measuring the scattered light.

12 Claims, 6 Drawing Sheets

(56) References Cited

U.S. PATENT DOCUMENTS

| | | | |
|---|---|---|---|
| 2007/0152985 A1 | 7/2007 | Ostergaard et al. | |
| 2008/0006766 A1 | 1/2008 | Oon et al. | |
| 2008/0007541 A1* | 1/2008 | Eliasson et al. | 345/176 |
| 2008/0088603 A1 | 4/2008 | Eliasson et al. | |
| 2008/0284925 A1 | 11/2008 | Han | |
| 2008/0286548 A1 | 11/2008 | Ellison et al. | |
| 2009/0128499 A1* | 5/2009 | Izadi et al. | 345/173 |
| 2009/0215607 A1 | 8/2009 | Dejneka et al. | |
| 2010/0302185 A1* | 12/2010 | Han et al. | 345/173 |

FOREIGN PATENT DOCUMENTS

| | | |
|---|---|---|
| WO | 2008004097 | 1/2008 |
| WO | 2008004101 | 1/2008 |

OTHER PUBLICATIONS

Kristen L. Barefoot et al.; U.S. Appl. No. 12/537,393; entitled "Strengthened Glass Articles and Methods of Making", 2009.

Jaymin Amin et al.; U.S. Appl. No. 12/545,475; entitled "Durable Glass Housings/Enclosures for Electronic Devices", 2009.

Sumriddetchkajorn et al.; "Ultra-High Contrast Low-Leadage-Light Optical Touch Device Structures Using Light Scattering and Total Internal Reflection Concepts"; Sensors and Actuators A, 126 (2006) 68-72.

G. Kodl.; "A New Optical Waveguide Pressure Sensor Using Evanescent Field"; IEEE, 2004 Electronic Components and Technology Conference, pp. 1943-1946.

The State Intellectual Property Office of the People's Republic of China; Search Report (Aug. 2014).

Japanese Patent Office; Notice Grounds for Rejection (Sep. 2014).

* cited by examiner

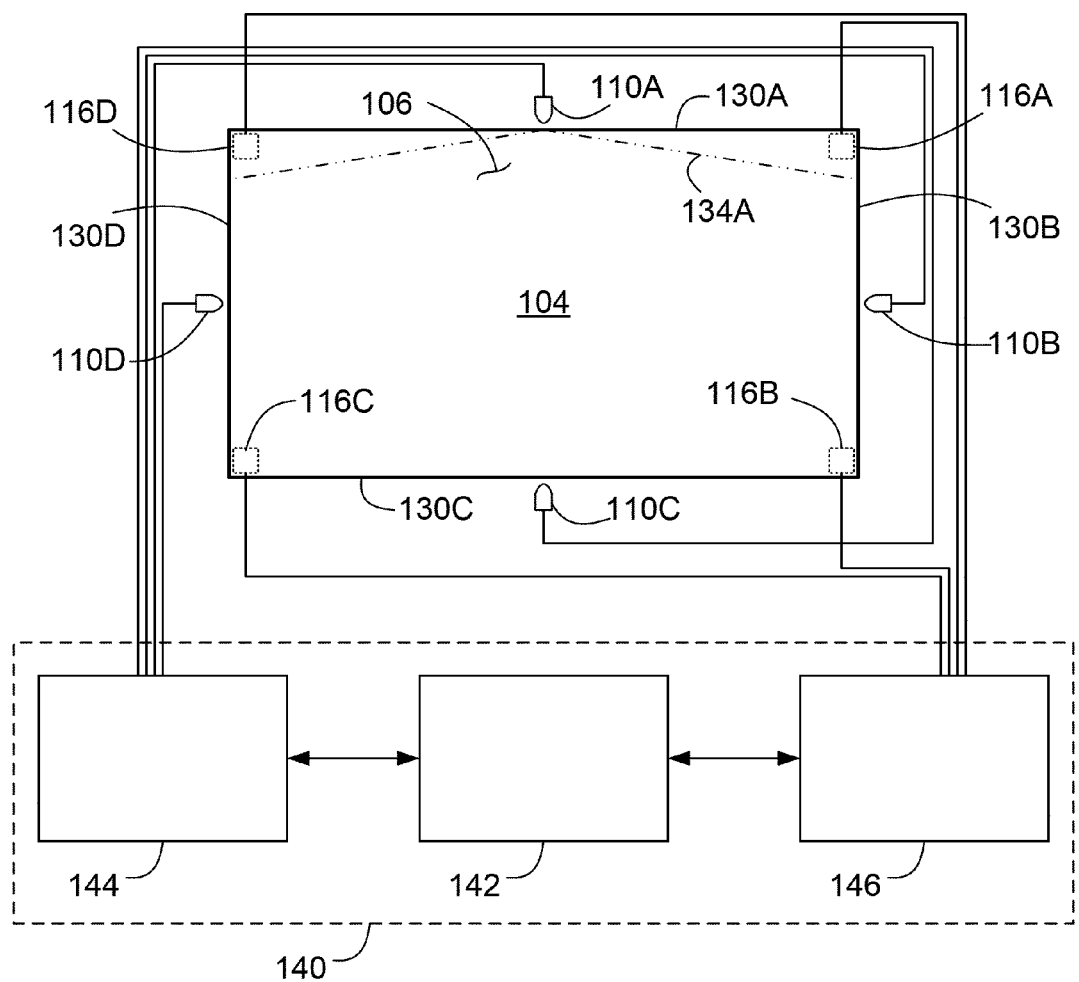

METHODS AND APPARATUS FOR SENSING TOUCH EVENTS ON A DISPLAY

This application is a continuation of U.S. patent application Ser. No. 12/625,882 filed on Nov. 25, 2009, the content of which is relied upon and incorporated herein by reference in its entirety, and the benefit of priority under 35 U.S.C. §120 is hereby claimed.

BACKGROUND OF THE INVENTION

The present invention relates to methods and apparatus for sensing touch events on a touch sensitive display, such as a liquid crystal display, organic light emitting diode display, etc.

The display market is prime for displays that offer touch sensing capability—and the market size for displays with touch functionality is expected to grow tremendously in the coming years. As a result, many companies have researched a variety of sensing techniques, including resistive, projected capacitive, infrared, etc. While many of these techniques result in reasonable touch capability, each technique carries some performance disadvantage for specific applications, and nearly all result in significant added cost to the manufacture of each display.

In terms of performance, the basic metrics for touch sensitive displays are the accurate sensing of a touch event and the determination of the precise location of the touch event on the touch/display window. Many secondary attributes are becoming important for added functionality, including flexibility in sensing various touching implements beyond the human finger, such as a pen, stylus, etc., the ability to sense multiple, simultaneous touch events, location resolution, and the ability to distinguish false touches (hovering, or environmental disturbances).

As touch sensitive displays are gaining wider use in mobile device applications, such as the iPhone™, iPOD™, etc., the overall thickness and weight of the touch sensitive display are becoming more important metrics for commercial viability. When such additional criteria are taken into consideration, very few sensor technologies stand out.

Currently, resistive touch-screens dominate the market because of their scalability and relatively low cost. A common variety of resistive touch-screen is the 4-wire type, where two un-patterned transparent conductors (typically coatings of Indium tin oxide, ITO) face one another, one on the underside of a plastic film and the other atop a glass substrate. Voltage is alternately applied to each conductor on opposing edges. Due to resistance within the conductors, a voltage drops across the sheet. When voltage is not applied to a given sheet, that sheet acts as a sensor. When the plastic film is displaced via a touch event, the two conductive sheets come in contact with one another and current flows from the energized sheet to the non-energized sheet. The voltage at the point of contact depends upon the distance from the input source, which allows the position of the contact to be determined in one dimension. By reversing the source and sense roles of the two sheets, the position can be similarly determined in the other dimension.

There are number of disadvantages associated with resistive touch-screens, such as the plastic film being relatively prone to damage, the ITO coating being prone to cracking (as such coating is fairly brittle), and the ITO coating neither being as transparent nor conductive as desirable. Resistive touch-screens are also unable to support multi-touch capability first popularized in the iPhone™ (which uses a capacitive touch-screen). The very light touch possible on the iPhone is also not possible on a resistive touch-screen because the film must be physically displaced to bring the two ITO coatings into contact.

Although more costly than the resistive variety, capacitive touch-screens are becoming more popular. A capacitive touch-screen includes a touch glass layer and a cover glass layer. The touch glass layer carries electrical traces (usually ITO) on opposing sides, usually in a crossing grid pattern with an insulator (the glass) therebetween. As the human body is a conductor, touching the cover glass results in a distortion of the local electrostatic field, measurable as a change in capacitance. A square wave is sequentially input into each electrical trace in a given direction, and the mutual capacitive coupling to each of the lines in the other direction is sensed. If a finger touches the cover glass, the mutual capacitance will be reduced at more than one unit cell (the crossing of respective traces of the grid). Capacitive touch-screens are desirable due to their ability to provide multi-touch sensitivity, their ability to sense even very light touch events, their robustness (no flexing is required), and their transparency characteristics.

The drawbacks of capacitive touch-screen technology include: the inability to sense the touch of a stylus, the difficulty in scaling to larger sizes, and the high cost of manufacture.

Accordingly, there are needs in the art for new methods and apparatus for advancing touch-screen technology to include: good scalability, low cost, sensitivity to a stylus, robustness, good transparency, sensitivity to multi-touch events, and sensitivity to light touch events.

SUMMARY OF THE INVENTION

In accordance with one or more embodiments described herein, methods and apparatus provide for a touch sensitive display, which may include: a display layer; a transparent layer disposed over the display layer; at least one source directing light to propagate into and/or through the transparent layer; at least one light sensing element in communication with the transparent layer and operating to receive scattered light in response to an object touching a surface the transparent layer and disturbing the propagation of the light therethrough; and a control circuit including a processor receiving signals from the at least one light sensing element indicative of the scattered light, and computing one or more positions at which the object touches the transparent layer.

A method in accordance with one or more embodiments described herein may include: disposing a transparent layer over a display layer; directing light to propagate into and/or through the transparent layer; measuring scattered light in response to an object touching a surface the transparent layer and disturbing the propagation of the light therethrough; and computing one or more positions at which the object touches the transparent layer based on signals obtained by the step of measuring the scattered light.

Other aspects, features, and advantages of the embodiments herein will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the embodiments described herein are not limited to the precise arrangements and instrumentalities shown.

FIG. 3 is a schematic view of an alternative implementation of a touch sensitive display in accordance with one or more further embodiments herein;

DETAILED DESCRIPTION OF THE PREFERRED EMBODIMENTS

Figure 1:
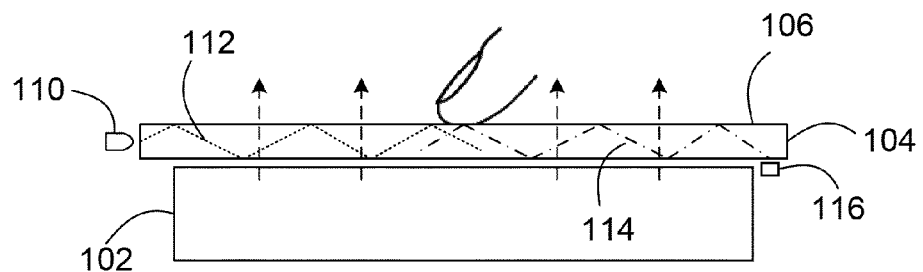
FIG. 1 is a side view of a touch sensitive display having certain characteristics that may be employed in one or more embodiments herein.

With reference to the drawings wherein like numerals indicate like elements there is shown in FIG. 1 a touch sensitive display 100A in accordance with one or more embodiments and aspects described herein. The touch sensitive display 100A may be used in a variety of consumer electronic articles, for example, cell-phones and other electronic devices capable of wireless communication, music players, notebook computers, mobile devices, game controllers, computer "mice", electronic book readers and other devices.

The touch sensitive display 100A includes a display layer 102 and a touch screen layer 104 (which may also operate as a protective cover layer). The touch sensitive display 100A may include an air gap between the display layer 102 and the touch glass 104.

The touch screen layer 104 includes a surface 106 which is available to a user to interact with the touch sensitive display 100A through touch events. Various indicia or indicium may be presented to the user on or through the surface 106 in order to guide the user in such interactivity. By way of example, the indicium may include areas on the surface 106 of the screen 104 that are set aside for indicating user choices, software execution, etc., just to name a few. As will be discussed in further detail later in this description, the touch sensitive display 100A may include electronic circuitry that receives signals from the screen 104 in order to detect the touching events, including the specific locations of the events on the surface 106.

The touch screen layer 104 may be formed from any suitable transparent material, such as glass, plastic, or the like. While plastic is less expensive, glass is believed to lead to better performance. Thus, the remainder of this description will assume that a glass material is used to form the touch screen layer 104. By way of example, the glass may be a chemically strengthened glass, such as a soda-lime type glass. One such glass is an alkali aluminosilicate glass hardened through ion exchange. These types of glasses are frequently compositions consisting, not only of $Na_2O$ (soda), CaO (lime) and $SiO_2$ (silica), but also of several other oxides such as MgO, $Li_2O$, $K_2O$, ZnO, and $ZrO_2$. Once hardened through ion exchange, these types of glass exhibit certain characteristics that make them desirable not only for touch screen applications, but also for cover glass (protective) applications. Further details as to the formulation and/or production details of soda-lime type glass suitable for use as the touch screen 104 may be found in one or more of: U.S. patent application Ser. No. 11/888,213 filed Jul. 31, 2007; U.S. patent application Ser. No. 12/537,393 filed Aug. 7, 2009; U.S. patent application Ser. No. 12/545,475 filed Aug. 21, 2009; and U.S. patent application Ser. No. 12/392,577 filed Feb. 25, 2009, the entire disclosures of which are hereby incorporated by reference.

The display layer 102 may be implemented using any of the known electronic display technologies, such as LCD display technology, etc. The display may include a backlighting mechanism (not shown) that produces and transmits light through the touch glass layer 104, generally perpendicularly through the surface 106 as illustrated by the dashed arrows. In one or more embodiments, the aforementioned indicium may be presented to the user by way of the display layer 102 projecting light through the touch screen layer 104.

Whether via the backlighting mechanism or another source of light 110, the touch sensitive display 100A includes at least one source directing light to propagate into and/or through the glass layer. In the case of the backlighting mechanism of the display layer 102, the light therefrom would propagate through the touch glass layer 104, generally perpendicularly. In the case of the light source 110, the light therefrom would couple into the touch glass layer 104 through the edge thereof and propagate within the glass in a guided mode 112. By way of example, the light source 110 may include one or more LEDs, such as visible light LEDs that emit light in the wavelength range of about 400 nm to about 650 nm, or infrared LEDs that emit light at wavelengths in excess of about 700 nm.

When an object, such as a user's finger, touches the surface 106 of the touch glass layer 104 the propagation of the light therethrough is disturbed, thereby creating scattered light energy 114. The touch sensitive display 100A includes at least one light sensing element 116 in communication with the glass layer 104 and operating to receive or sense the scattered light energy 114 in response to the object touching the surface 106. The at least one light sensing element 116 (such as a photodiode, imager, or similar device) may produce signals indicative of the scattered light energy 114 sufficient to compute one or more positions at which the object touches the glass layer 104. Methods of computing the positions of touch events will be discussed in more detail later in this description.

Figure 2A:
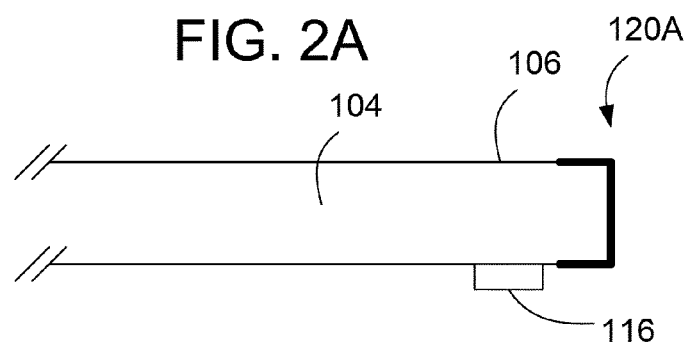
FIGS. 2A-2B are side views of touch sensitive displays employing light reflection reduction mechanisms in accordance with one or more embodiments herein.

In order to maintain good signal to noise ratios for accurate sensing of the scattered light 114 by the light sensing element 116, it is desirable to minimize reflections of the in-coupled light 112 and/or the scattered light 114 off of the edge surfaces of the touch glass layer 104. In this regard, and with reference to FIGS. 2A and 2B, the touch sensitive display 100A (and/or any of the other embodiments herein) may further include one or more light suppressing mechanisms 120A and/or 120B, which operate to reduce such light reflections.

The light suppressing mechanism 120A includes a low reflectance pigment (such as black paint or light absorbing material) disposed along at least one edge of the glass layer 104. When at least one source 110 is employed to in-couple the light 112, then it is desirable to have the low reflectance pigment of the light suppressing mechanism 120A disposed on an opposite edge from the source 110. The low reflectance pigment may perform well when applied only to the edge surface itself; however, it is believe that advantageous results are obtained when the pigment is disposed on the edge surface as well as on at least a portion of the upper and lower surfaces of the glass 104 adjacent such edge. It may be best to include the pigment on all edge surfaces of the glass layer 104 as well as the associated portions of the adjacent surfaces.

The light suppressing mechanism 120B includes a tapering thickness of the glass layer 104 at the edge or edges. Again, when at least one source 110 is employed to in-couple the light 112, then it is desirable to have the tapering edge of the light suppressing mechanism 120B disposed on an opposite edge from the source 110. Further, it may be likewise desirable to employ the light suppressing mechanism 120B on all edges of the glass layer 104. The taper of the light suppressing mechanism 120B imparts a "leaky-waveguide" characteristic to the touch glass layer 104 in order to suppress light reflections back into the glass. In essence, the taper of the light suppressing mechanism 120B reduces the backscattering by allowing light reaching the edge of the glass layer 104 to leak out.

Figure 2B:
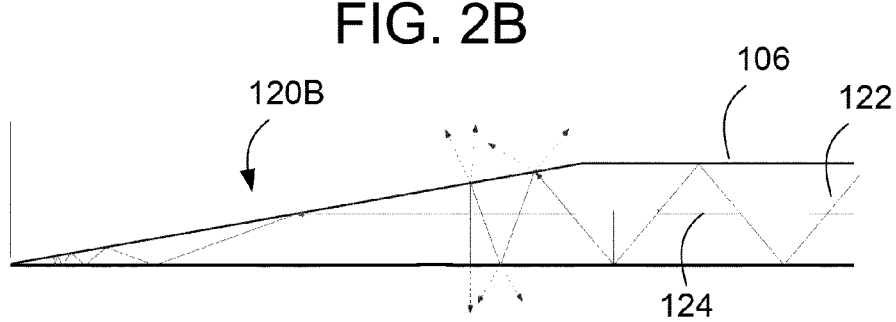

To illustrate the functionality of the leaky-waveguide characteristic, FIG. 2B illustrates two guided rays within the touch glass layer 104. The first ray 122 is at about 40 degrees with respect to normal of the surface 106, which is near the critical angle of about 39.5 degrees for a glass with a refractive index about 1.572. The second ray 124 propagates down the center of the touch glass layer 104 before striking the tapered region. These two rays 122, 124 represent the extreme range of guided wave ray angles. As the rays 122, 124 strike, reflect, and re-strike the tapered portion of the light suppressing mechanism 120B, the angle of incidence changes until they are incident below the critical angle and begin to leak out of the touch glass layer 104. In this way, reflectance back into the touch glass layer 104 is reduced and/or minimized.

The quality of the suppression of the backscattering (e.g., the number of bounces and return loss) will depend on the geometry and the refractive index of the touch glass layer 104. It has been estimated via calculation that, for a glass with a refractive index of about 1.572, a thickness of 1 unit, and a taper of 10 degrees (e.g., tapering for about 5.59 units), the rays 122, 124 will experience approximately 7 leaky bounces. Although a taper of 10 degrees has been considered and disclosed, other taper angles may be employed. Generally, the shallower the taper, the more leaky bounces the rays 122, 124 will encounter before reflecting back into the touch glass layer 104. Further calculations as to the ray 122 revealed a return loss (due to the seven leaky bounces) of about 6.65E-13 for p-polarized light, and 3.01E-9 for s-polarization. The reflected light is strongly s-polarized. Since an LED source 110 is randomly polarized, the average edge reflection is about 1.5E-9. Further suppression of the reflection (two or three orders of magnitude) can be achieved by placing a p-transmitting polarizer in front of the light sensing element 116. In addition, employing the aforementioned pigment (such as black paint or light absorbing material) on the taper may also reduce the edge reflection.

Reference is now made to FIG. 3, which illustrates a schematic of an alternative implementation of a touch sensitive display 100B in accordance with one or more further embodiments herein. The touch sensitive display 100B includes a display layer (not shown) and a touch glass layer 104, which is shown from a top view, and which again may also operate as a protective cover glass layer. In this embodiment, the touch sensitive display 100B includes a plurality of sources of light 110A, 110B, 110C, and 110D, where each source 110 is in communication with a respective one of the edges 130A, 130B, 130D, and 130D of the screen 104. As will be discussed in more detail below, employing at least one source 110 at each edge 130 of the screen 104 provides advantageous functionality as opposed to lesser numbers of sources 110. Nevertheless, although four such sources 110 are shown, any reasonable number may be used. For example, two, three or more such sources 110 may be employed.

The touch sensitive display 100B includes a plurality of light sensing elements 116A, 116B, 116C, and 116D, each located strategically about a periphery of the screen. In particular, advantageous operation may be achieved when a respective one of the light sensing elements 116 is located at each corner of the screen 104. It is understood, however, that any number of light sensing elements 116 may be employed, and any location(s) thereof may be used, so long as sufficient sensing capability is achieved.

The touch sensitive display 100B also includes, or is coupled to, a control circuit 140. The control circuit 140 provides the functionality necessary for energizing the sources 110, receiving signals from the light sensing elements 116, and processing such signals to determine the one or more positions at which the object touches the surface 106 of the touch glass layer 104. In particular, the control circuit includes a microprocessor 142, a driver circuit 144, and an interface circuit 146. The microprocessor 142 is coupled to the driver circuit 144 and the interface circuit 146 via signal lines, buses, or the like. The microprocessor 142 executes computer readable code (software programs) that controls and orchestrates the activities of the driver circuit 144 and the interface circuit 146 to achieve the aforementioned functions. For example, the microprocessor 142 may provide control signals to the driver circuit 144 indicating when to turn on and turn off the respective sources 110. As will be discussed in more detail later herein, the microprocessor 142 may also provide additional information such that the driver circuit 144 modulates the light emitted from the sources 110. The interface circuit 146 receives signals from the light sensitive elements 116 and processes such signals so that they may be input into the microprocessor 142. For example, when the light sensitive elements 116 are photodiodes, the interface circuit 146 may provide appropriate biasing conditions to the photodiodes such that they are able to properly sense light energy. In this regard, the interface circuit 146 may cause certain light sensing elements 116 to be active and others inactive during particular intervals of time. The interface circuit 146 may also process analog signals received from the photodiodes and convert same to a digital format for the microprocessor 142.

The microprocessor 142 may be implemented utilizing suitable hardware, such as standard digital circuitry, any of the known processors that are operable to execute software and/or firmware programs, one or more programmable digital devices or systems, such as programmable read only memories (PROMs), programmable array logic devices (PALs), etc. Furthermore, although the control circuit 140 is shown as being partitioned into certain functional blocks (the microprocessor 142, the driver 144, and the interface 146), such blocks may be implemented by way of separate circuitry and/or combined into one or more functional units.

The microprocessor 142 may execute different software programs to carry out different techniques for computing the one or more positions at which the object touches the surface 106 of the touch glass layer 104. One such technique is triangulation, which is a well known process for determining the location of a variable point (in this case the point(s) at which the object touches to screen 104) by measuring angles to such point from known points. The variable point can then be computed as the third point of a triangle with one known side and two known angles. In the touch sensitive display 100B, any two of the light sensitive elements 116 may provide the fixed points in the triangulation algorithm. In order to improve the accuracy of the position calculation, it may be desirable to use multiple pairs of the light sensitive elements 116 to compute the touch point a plurality of times and then using statistical computations to arrive at a final touch location.

In some embodiments, the operational characteristics of the light sensitive elements 116 may make the use of triangulation problematic. For example, if the light sensitive elements 116 are photodiodes, which only measure light intensity, then triangulation may be difficult or impossible. An alternative approach to computing the position of a touch event is to compare the respective signal strengths sensed by the light sensitive elements 116. By way of example, if elements 116A and 116D measure the same signal strength, then it may be determined that the position of the touch event lies on a line equidistant from the two elements 116A and 116D. If the signals are not equal, however, then the position of the touch event may be determined to be closer to one element than the other. Indeed, the position of the touch event would not lie on a line, but rather on an arc. By sensing the signal strength of a third element 116B, a determination of a single point for the touch position may be achieved. For purposes of illustration and not limitation, an exemplary algorithm for computing the position of touch events on the screen 104 based on amplitude data received from the light sensing elements 116 is discussed later in this description under the heading of "EXAMPLE—POSITION SENSING ALGORITHM".

Among the factors influencing the accuracy of the mathematical technique used to compute the touch location is the ability of the microprocessor 142 to distinguish among the signals received from the light sensing elements 116 as resulting from light energy from a particular light source 110 or set of light sources 110. In this regard, the control circuit 140 is operable to cause the light emanating from at least two (and preferably all) of the sources 110 to include at least one distinguishing characteristic. In this way, the microprocessor 142 may extract an indication of such characteristic from the signals produced by the light sensitive elements 116 and, thus, distinguish which of the signals are from scattered light produced in response to particular ones of the sources 110.

The distinguishing characteristics may include at least one of: (i) a differing wavelength of the light emanating from two or more of the sources 110; (ii) a modulation component whereby the light emanating from two or more is modulated with respective, differing codes; and (iii) a frequency modulation component whereby the light emanating from two or more sources is modulated with respective, differing frequencies, and (iv) a temporal component (or time multiplexing) whereby light emanates from two or more of the sources at differing times.

Taking each of the above distinguishing characteristics in turn, each of the sources 110 may be implemented with a respective LED of differing light wavelength. For example, the source 110A may emit light within a first range of wavelengths, such as between about 430 nm and about 470 nm (which is generally the blue light spectrum). The source 110B may emit light within a second range of wavelengths, such as between about 490 nm and about 550 nm (which is generally the green light spectrum). The source 110C may emit light within a third range of wavelengths, such as between about 615 nm and about 650 nm (which is generally the red light spectrum). These visible blue, green, and red ranges of wavelengths are for illustration purposes only. Indeed, other ranges (including composite blue-green, green-red, etc.) are also possible. Further, non-visible wavelengths may also be employed, such as infra-red wavelengths. Thus, for example, the source 110D may emit light within a fourth range of wavelengths, such as between about 820 nm and about 880 nm.

Given that two or more of the sources 110 may be emitting light at different wavelengths, steps may be taken within the screen 104 itself and/or the control circuit 140 to distinguish among the signals received from the light sensing elements 116. For example, the light sensing elements 116 may be positioned in ways that would tend to cause only certain elements 116 to sense scattered light originating from certain sources 110. In particular, given the orientation of the light sensing elements 116, the light projection field of each source 110 may exclude certain of the light sensing elements 116. By way of example, the light projection field of the source 110A may include portions of the screen 104 only forward of dashed lines 134A. Assuming that light reflections at the edges 130 of the screen 104 are reduced or minimized, only light sensing elements 116A and 116D (along the same edge 130A as source 110A) would receive scattered light energy from a touch event originating from, and no light energy directly incident from, the source 110A. Similar analysis would apply to the other sources 110 and light sensing elements 116.

The light sensing elements 116 themselves may be responsive to the wavelength of light energy in different ways as is known in the art. For example, a given light sensing element 116 may include sensors responsive to some wavelengths and not others, thereby providing an output indicative of not only the magnitude of the light energy received, but also as to the wavelength(s) thereof.

The control circuit 140, and the microprocessor 142 in particular, can distinguish among the signals received from the respective light sensing elements 116 as being from light scattering events as opposed to incident light from the sources 110. Further, such signals may be used in a mathematical algorithm suitable for computing the location or locations of touch events on the screen 104.

As discussed above, the accuracy of the touch position calculation using the distinguishing characteristic of wavelength (as well as one or more other characteristics to be discussed below) is influenced by the extent and character of light reflections at the edges 130 of the screen 104. It is most desirable that such edge reflections are reduced or minimized. In this regard, the touch sensitive display 100B may include additional features to reduce such edge reflections beyond or in addition to those previously discussed with respect to FIGS. 2A-2B.

Figure 4:
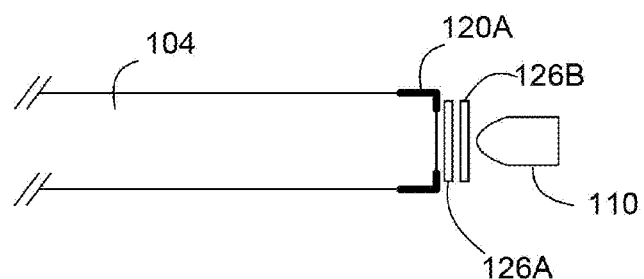
FIG. 4 is a side view of a touch sensitive display employing a further light reflection reduction mechanism in accordance with one or more embodiments herein.

In this regard, reference is made to FIG. 4, which illustrates a side view of the touch glass layer 104 employing a further light reflection reduction mechanism. In particular, the low reflectance pigment 120A may be disposed along an edge 130 (preferably all edges) of the glass layer 104. The low reflectance pigment 120A may include a respective window therethrough adjacent the respective sources 110 such that the light therefrom is coupled unimpeded into the glass layer 104. In order to reduce reflections from the window and/or the source 110 itself (arising from light energy incident from another source or scattering event) at least one filter 126 may be disposed between the source 110 and the edge 130 of the glass layer 104. The filter 126 operates to attenuate light substantially outside the range of wavelengths produced by the respective source 110. In this way, the window and the source 110 itself will appear "dark" (i.e., non-reflective) to light outside such range of wavelengths. In the case of visible wavelength ranges, it is possible to employ a single filter 126, depending on the particular filter characteristics thereof. However, in some cases first and second filters 126A, 126B may be required to filter the entire range of interest. For example, one filter 126A may attenuate light outside a first range of visible wavelengths (such as the aforementioned blue light range), while another filter 126B may attenuate light outside another such range, such as the infrared range of wavelengths.

Figure 5:
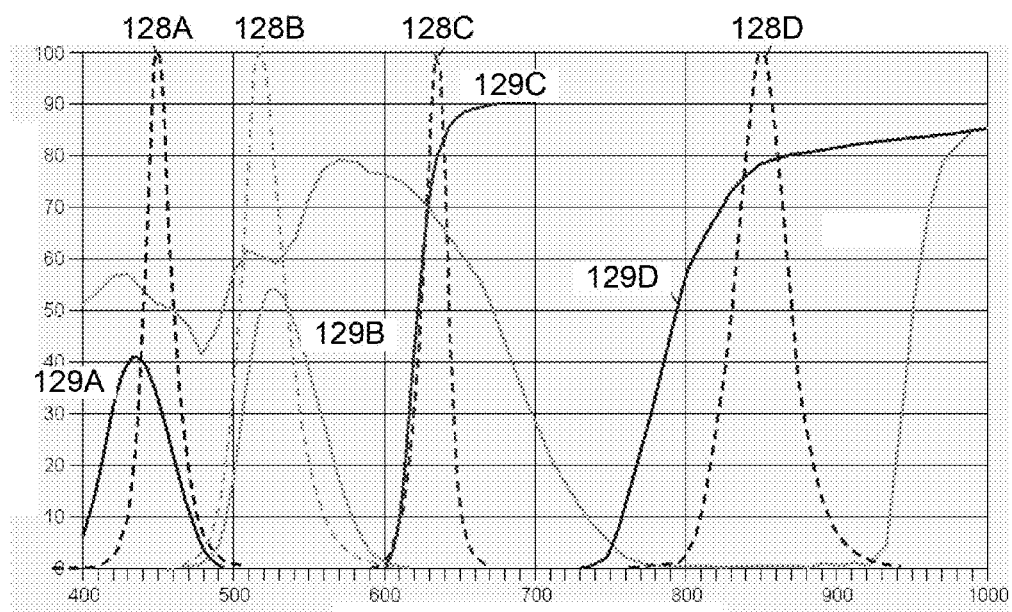
FIG. 5 is a graph illustrating some transmission characteristics of one or more filters used in the light reflection reduction mechanism of FIG. 5.

FIG. 5 is a graph illustrating some transmission characteristics of one or more of the filters 126. In particular, relationships between the incident light wavelengths (e.g., blue 128A, green 128B, red 128C, infra-red 128D) and the respective filter characteristics 129A, 129B, 129C, 129D are shown. The vertical axis of the graph is percent transmission of the source 110 or through the filter 126 as the case may be, while the horizontal axis is light wavelength in units of nm.

If it is determined that the aforementioned pigment, taper, and/or filers 126 do not attenuate the edge reflections sufficiently, then further discrimination of desired signals versus undesired signals from the light sensing elements 116 may be obtained by modulating the light produced by the sources 110 with some additional information. By way of example, the driver circuit 144 may modulate one or more of the sources 110 such that the respective light therefrom includes a certain code or codes, such as orthogonal codes, like well known Walsh codes. By way of example, the light produced by a particular source 110 may include a modulated 20 bit Walsh code at a particular bit rate (such as 1 KHz). The interface circuit 146 may include a receiver that can demodulate the particular Walsh code and reject signals that do not include such code. This modulation/demodulation process ensures that only signals produced in response to scattered light from a touch event (as opposed to light emitted directly by other sources 110 on an opposing or adjacent edge) are processed to compute the touch location. It is noted that modulator and demodulator circuits (such as for orthogonal coding schemes) are well known in the signal processing arts. For the purposes of discussion, a more detailed description of an implementation of such modulator and demodulator circuits is presented later in this description under the heading "EXAMPLE—CODE MODULATION IMPLEMENTATION".

A variant of the above code modulation is the use of frequency modulation. In this embodiment, the driver circuit 144 may modulate one or more of the sources 110 such that the respective light therefrom includes a certain frequency or frequencies (which may be distinguished by a tuned receiver). The interface circuit 146 may include a suitable receiver that can demodulate the particular frequency and reject signals that do not include such frequency. As with code modulation, this modulation/demodulation process ensures that only signals produced in response to scattered light from a touch event (as opposed to light emitted directly by sources 110 on an opposing or adjacent edge) are processed to compute the touch location. It is noted that frequency modulator and demodulator circuits are well known in the signal processing arts and, therefore, a detailed description of implementations thereof are omitted from this description.

Now, taking the next of the distinguishing characteristic that may be employed to assist in isolating the signals carrying information as to particular scattering events and particular light sensing elements 116, each of the sources 110 may be energized in a time multiplexing fashion. For example, the control circuit 140 (e.g., the driver circuit 144) may cause only one (or particular ones) of the sources 110 to emit light during a particular time interval. Concurrently, the control circuit 140 (e.g., the interface circuit 146) may permit only certain ones of the light sensing elements 116 to be active during such time interval.

To illustrate the above, when source 110A is active, the control circuit 140 may only activate light sensing elements 116A and 116D. Under these conditions, and assuming limited edge reflections, only light sensing elements 116A and 116D (along the same edge 130A as source 110A) would receive scattered light energy from a touch event originating from, and no light energy directly incident from, the source 110A. Similar analysis would apply to the other sources 110 and light sensing elements 116 during other time intervals. It is noted that this time multiplexing approach may be employed by energizing more than one source 110 at a time, although care must then be taken to account for multiple sources in the computation of the touch position. Further, the time multiplexing approach may be employed with sources 110 of the same wavelength or range of wavelengths, since the number of sources 110 and light sensing elements 116 active at one time is limited. Thus, in order to reduce the impact of smudges on the surface 106 of the touch screen 104, and/or permit indicium to be actually painted on, or otherwise obstructing, such surface 106, the sources may be all of the infra-red variety.

Using the time multiplexing approach, the control circuit 140 can distinguish among the signals received from the respective light sensing elements 116 as being from light scattering events as opposed to incident light from the sources 110. This permits such signals to be used in, for example, the algorithm to compute the location or locations of touch events on the screen 104. Again, the exemplary algorithm discussed under the heading of "EXAMPLE—POSITION SENSING ALGORITHM" may be employed for computing the positions of the touch events.

Figure 6:
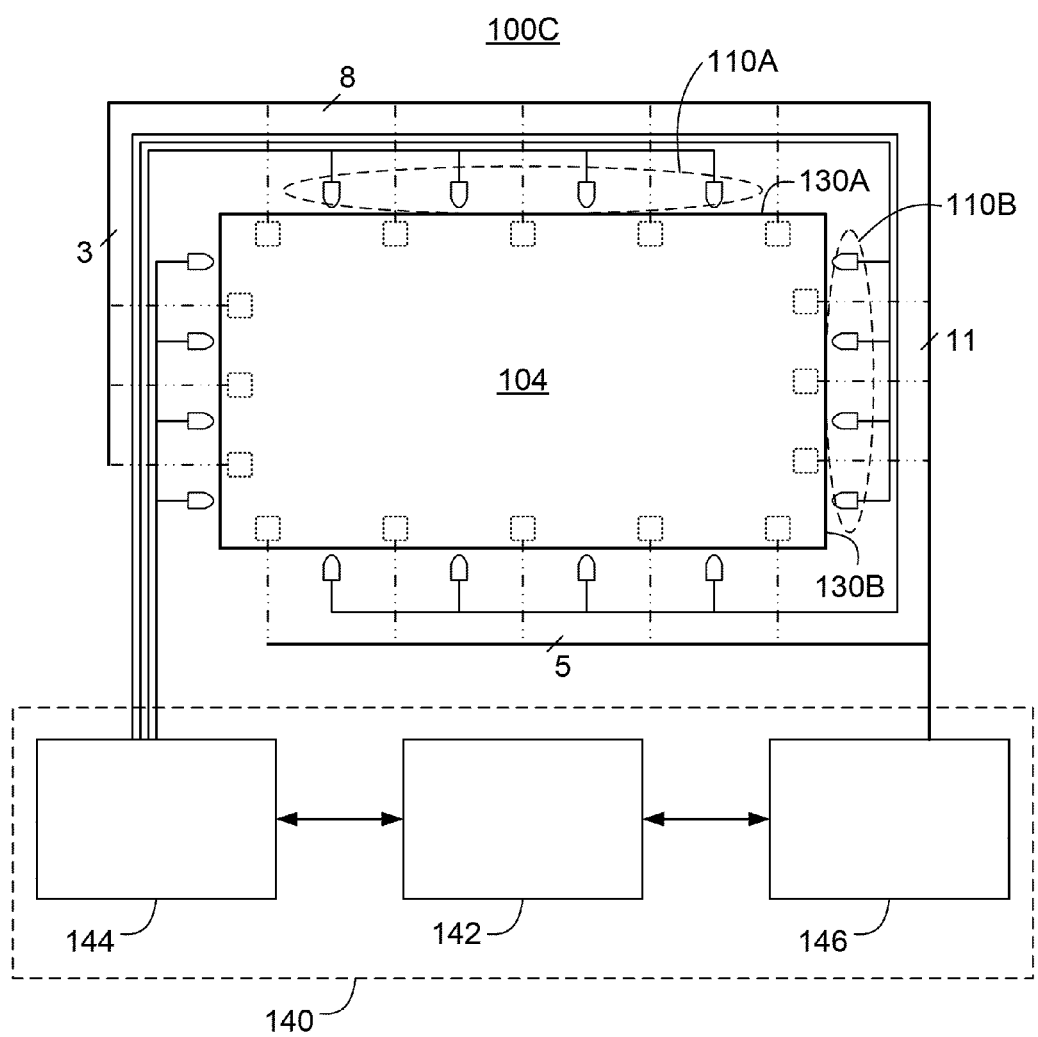
FIG. 6 is a schematic view of a further alternative implementation of a touch sensitive display in accordance with one or more still further embodiments herein.

Reference is now made to FIG. 6, which illustrates a schematic of an alternative implementation of a touch sensitive display 100C in accordance with one or more further embodiments herein. The touch sensitive display 100C also includes a display layer (not shown) and a touch glass layer 104, which is shown from a top view. In this embodiment, the touch sensitive display 100C includes a plurality of sources of light 110A (such as four) along the one edge 130A, a plurality of sources of light 110B along another edge 130B, etc. Similarly, the touch sensitive display 100C includes a plurality of light sensing elements (such as four) along the edge 130A, a plurality of light sensing elements along the other edge 130B, etc. As with other embodiments herein, the touch sensitive display 100C also includes, or is coupled to a control circuit 140. The touch sensitive display 100C may operate in similar ways as the touch sensitive display 100B of the prior embodiments, however, all the sources 110 along a given edge 130 of the screen 104 may be of the same wavelength (or range thereof) in the case of wavelength division multiplexing, and/or be activated/deactivate at the same time, in the case of time division multiplexing. So too for the light sensing elements 116 along each respective edge 130.

In accordance with a further alternative implementation of a touch sensitive display, any of the aforementioned implementations shown in FIGS. 1, 3, and 6 may operate on the principal of fluorescence. In the event that the object (such as a human finger) fluoresces in response to incident light from touching the surface 106 of the glass layer 104, the fluorescent light from the object may couple into the glass layer 104. As the fluorescent light, through careful selection of the sources 110, may be of a different, higher wavelength than the incident light, the scattered light may be readily detected and detection of incident light rejected by the control circuit 140.

As described in the current draft, a finger can backscatter light allowing detection of a touch event. A passive stylus that could similarly scatter light could do the same. But the possibility exists to provide an active stylus. Rather than reflecting light provided in or through the cover glass, the active stylus would be a light source.

Figure 7:
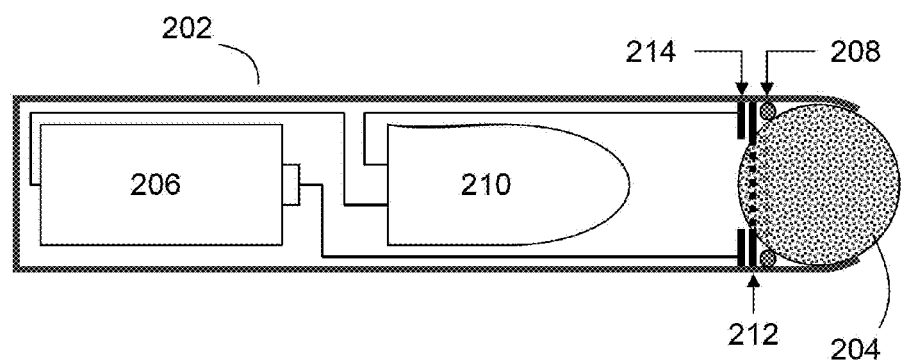
FIG. 7 is a schematic view of an active stylus that may be used in accordance with one or more still further embodiments herein.

Reference is now made to FIG. 7, which is a schematic diagram of an active stylus 200 that may be used in combination with one of more of the touch sensitive displays 100 disclosed herein. In general, the approach of the active stylus 200 is to place the light source 210 for touch position sensing within the housing 202 of the implement that the user employs to touch the touch screen 104, rather than relying on light scattering. The advantage of this approach is one of robustness since the light source 210 would be far stronger than any backscattered light, so strong in fact that the user could possibly rest their palm on the screen 104 while writing with the stylus 200 without attenuating so much light as to preclude position detection. When using the active stylus 200, the sources 110 providing light in or through the touch screen 104 are not necessary, so they may be eliminated altogether or turned off temporarily. Temporarily turning off the sources 110 would provide for dual modes of operation: one mode for touch sensitivity using the sources 110; and another mode for touch sensitivity using the active stylus 200.

The light source 210 may be an LED, such as an IR LED, in which case the light sensing elements 116 would be adapted to sense IR light. If the light is to be modulated as discussed above, then a means for synchronizing the emission of light from the source 210 and the signals detected at the light sensing elements 116 would be employed. Such means would be readily apparent to a skilled artisan given the discussion above and the system shown and described later herein with respect to FIG. 9. The light from the source shines into a ball 204 at a distal end of the housing 202, which ball 204 diffuses and randomizes the light emitted from the stylus 200. Such diffusion eliminates the attitude of the stylus 200 from influencing the detection of the light from the point of view of the light sensing elements 116. The ball 204 may be made of any suitable material, such as plastic that is filled with, for example, about 1% titanium dioxide to act as the scattering agent.

It is not desirable to have the source 210 energized by the battery 206 when there is no contact with the touch screen 104. There are a wide variety of potential mechanical configurations to permit the stylus 200 to only turn on when in contact with the screen 104. By way of example, the ball 204 may be biased forward toward the distal end of the housing 202 by way of a spring ring 208. The spring ring 208 may be made of some elastomeric material that can be compressed with relatively little force but springs back to its normal larger shape when pressure is released. When pressure is placed on the ball 204 and the spring ring 108 is compressed, a conductive contact plate 212 joins two switch contacts 214 allowing current to flow from the battery 206 to the source 210. Additionally or alternatively, the battery 206 may be eliminated and the stylus 200 may be able to scavenge power output by a host within the touch sensing display 100.

Figure 8:
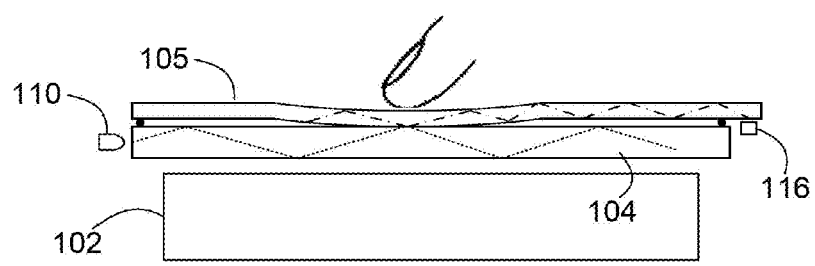
FIG. 8 is a side view of an alternative touch sensitive display in accordance with one or more further embodiments herein.

FIG. 8 illustrates a further alternative touch sensitive display 110D. The touch sensitive display 100D includes a display layer 102, a glass layer 104 (which may be disposed above the display layer 102), and a resilient touch layer 105 atop the glass layer 104. A gap is produced between the resilient touch layer 105 and the glass layer 104 via spacers or the like. The touch layer 105 is formed from a suitable polymer that may flex and contact the glass layer 104 in response to a touch event. In addition, the touch layer 105 is formed from a material that has good waveguiding properties. The light source 110 produces light that is coupled into and propagates within the glass layer 104 in a guided mode. Due to total internal reflection within the glass layer 104, without a touch event, no light is coupled into the touch layer 105 and, therefore, no scattered light is sensed by the light sensing elements 116. Upon a touch event, the guided mode of the light propagating within the glass layer 104 is disrupted and some of that light couples into the touch layer 105. The light sensing elements 116 may thus measure such light and provide signals indicative thereof to a control circuit (not shown). In this way the control circuit may compute the location of the touch event using similar techniques and apparatus discussed above.

Example

Position Sensing Algorithm

This section describes a position detection algorithm that may be used for computing touch events in one or more of the embodiments disclosed and discussed above. In this section, we describe the position-detection algorithm, along with considerations related to its implementation in a program that manages the operation of the touch sensitive display.

By way of background, in everyday life, we often need to evaluate the probability of random events. Examples include throwing a dice, drawing a card from a deck or estimating the noise of measurement instruments. In these cases, knowledge of a model describing the physical system (the probability distribution) is used to make predictions about the outcome. When modeling data, we want to do just the opposite: given the knowledge of empirical data, we want to find a model that provides a good description. The way to achieve this may be found with reference to Bayes' theorem, which states that $$P(A|B) = \frac{P(A)P(B|A)}{P(B)}. \tag{1}$$

Applied to the present problem of finding the model given the empirical data, Bayes' theorem becomes $$P(\text{model}|\text{data}) = \frac{P(\text{model})P(\text{data}|\text{model})}{P(\text{data})}. \tag{2}$$

The probability P(model) is called the prior; it can be taken to be a constant if no assumption is made about which model is likely to be valid. The denominator is simply a normalization constant that ensures that the probability of all models be equal to one. Consequently, we find that $$P(\text{model}|\text{data}) \propto P(\text{data}|\text{model}), \tag{3}$$

which means that the probability of a model being valid given the supporting data is proportional to the probability of observing the data given that particular model. This result is the foundation of the parameter fitting method discussed herein.

The physical setup provides us with N data points (the signals measured by the detectors 116), denoted $f_i$, i=1, . . . , N, that we want to fit to a model $f_i(a_1, \ldots, a_M)$, where $a_j$, j=

1, ..., M, are unknown parameters. This model is a function usually built using some physical insight about the nature of the random process.

If the experimental error on each data point is normally distributed with standard deviation $\sigma_i$, then the probability of measuring the data set $\tilde{f}_i$ experimentally given that the model predicts the values $f_i$ is given by $$P(\text{data}|\text{model}) \propto \prod_{i=1}^{N} \exp\left[-\frac{1}{2}\left(\frac{\tilde{f}_i - f_i}{\sigma_i}\right)^2\right] \Delta f. \quad (4)$$

We know, per our discussion of Bayes' theorem, that Eq. (4) is also the probability of the model being valid, given the observed data. Therefore the most probable model is the one that maximizes Eq. (4), or, equivalently, that minimizes the negative of its logarithm, $$\left[\sum_{i=1}^{N} \frac{(\tilde{f}_i - f_i)^2}{2\sigma^2}\right] - N \log \Delta f. \quad (5)$$

Since N and $\Delta f$ are constants, finding the most probable model is equivalent to minimizing the quantity $$\chi^2(a_1, \ldots, a_M) \equiv \sum_{i=1}^{N} \frac{1}{\sigma_i^2}\left[\tilde{f}_i - f_i(a_1, \ldots, a_M)\right]^2. \quad (6)$$

So the problem is reduced to finding the minimum of a (in general) nonlinear function in the M-dimensional parameter space. The values of $a_1, \ldots, a_M$ which minimize $\chi^2$ are called the "best-fit parameters or maximum likelihood estimators".

The least-squares procedure outlined above includes making an assumption about a model and choosing the parameters that yield the best fit between the model and the data. But it does not actually guarantee that the model is a good representation of the random process. We need a "goodness-of-fit" criterion to decide whether the model is adequate.

This criterion is provided by the following result: if the model is linear in its parameters, then the quantity $\chi^2$, when minimized, obeys the chi-square distribution with $v=N-M$ degrees of freedom. Consequently, the probability Q that the "true" model has a chi-square as large as $\chi^2$ is given by $$Q = 1 - P(\chi^2|v), \quad (7)$$

where $P(\chi^2|v)$ is the incomplete gamma function, $$P(\chi^2|v) = \int_0^{\chi^2} p(x, v) dx, \quad (8)$$

with $$p(x, v) = \frac{1}{2^{v/2} \Gamma(v/2)} x^{v/2-1} e^{-x/2}. \quad (9)$$

The incomplete gamma function is available with most computational software; in Matlab™ it is called by the command "gammainc". If Q is close to one, then the model fits the data well. Conversely, if it is very small, then the fit is not a good one. In practice, Q can be as small as $10^{-3}$ before a model is rejected.

Although the chi-square distribution is strictly valid for linear models only, it is usually a good approximation even for models that are nonlinear in their parameters.

We assume that the model $f_i(a_1, \ldots, a_M)$ has a nonlinear dependence on the parameters $a_j$. For this reason, the minimum of the chi-square must be found iteratively. Starting from some initial guess, we modify the parameters in order to decrease the value of $\chi^2$. We repeat the procedure until $\chi^2$ stops decreasing.

Two regimes should be considered, depending on whether $\chi^2$ is close to a minimum or away from it. Away from a minimum, its first derivative is large, so chi-square can be decreased by taking steps down the gradient. Starting from the values of the parameters at step n, denoted by the vector $a^{(n)}$, the values at step n+1 are given by $$a^{(n+1)} = a^{(n)} - \text{constant} \times \nabla \chi^2(a^{(n)}). \quad (10)$$

The constant appearing in this equation should be small enough so as to not miss the minimum by overshooting. Appropriate values are given below.

Near a minimum, the gradient of $\chi^2$ is small and consequently a quadratic local expansion around the minimum $a_{min}$ is valid:

$$\chi^2(a) \approx \chi^2(a_{min}) + \frac{1}{2} \sum_k \sum_l \frac{\partial^2 \chi^2}{\partial a_k \partial a_l}(a_k - a_{k,min})(a_l - a_{l,min}). \quad (11)$$

Taking derivatives with respect to $a_k$, we get $$\frac{\partial \chi^2}{\partial a_k} \approx \sum_l \frac{\partial^2 \chi^2}{\partial a_k \partial a_l}(a_l - a_{l,min}) \quad (12)$$

We introduce the notation $$\beta_k = -\frac{1}{2} \frac{\partial \chi^2}{\partial a_k} \quad (13)$$

and $$\alpha_{kl} = \frac{1}{2} \frac{\partial^2 \chi^2}{\partial a_k \partial a_l}. \quad (14)$$

Then Eq. (12) can be written as $$\beta_k \approx \sum_l \alpha_{kl}(a_{l,min} - a_l) \quad (15)$$

or, in matrix form, $$\beta \approx \alpha(a_{min} - a). \quad (16)$$

Therefore, starting from the value $a^{(n)}$ at step n, an approximation to the minimum at step n+1 is given by $$a^{(n+1)} = a^{(n)} + \alpha^{-1} \beta. \quad (17)$$

Let us elaborate on the calculation of the matrix elements $\beta_k$ and $\alpha_{kl}$. From the definition Eq. (6), we have $$\beta_k = \sum_{i=1}^{N} \frac{1}{\sigma_i^2} (\tilde{f}_i - f_i) \frac{\partial f_i}{\partial a_k} \quad (18)$$

and $$\alpha_{kl} = \sum_{i=1}^{N} \frac{1}{\sigma_i^2} \left[ \frac{\partial f_i}{\partial a_k} \frac{\partial f_i}{\partial a_l} - (\tilde{f}_i - f_i) \frac{\partial^2 f_i}{\partial a_k \partial a_l} \right] \quad (19)$$

The second term, involving the second derivative of $f_i$, is often ignored in practice because it is likely to be small compared with the term containing the first derivatives and can actually cause the minimization algorithm to become unstable. Therefore we will use the following formula to calculate the matrix elements $\alpha_{kl}$:

$$\alpha_{kl} = \sum_{i=1}^{N} \frac{1}{\sigma_i^2} \frac{\partial f_i}{\partial a_k} \frac{\partial f_i}{\partial a_l}. \quad (20)$$

Equations (10) and (17) give the iteration procedure depending on whether the chi-square is far from or close to a minimum. But how do we know which regime we are in, and when to do the transition? A clever trick is put forward by the Levenberg-Marquardt method. It also solves the problem of finding a constant to use in Eq. (10).

Suppose that we replace the matrix $\alpha$ by $\alpha'$, obtained from $\alpha$ by multiplying the diagonal elements by $1+\lambda$, where $\lambda$ is a constant whose value can be changed from one iteration to the next:

$$\alpha'_{ll} = \alpha_{ll}(1+\lambda) \quad (21)$$

$$\alpha'_{kl} = \alpha_{kl} \text{ for } k \neq l. \quad (22)$$

Upon replacement, Eq. (17) becomes $$a^{(n+1)} = a^{(n)} + (\alpha')^{-1}\beta. \quad (23)$$

The iteration formula Eq. (23) ensures the transition from the region away from a minimum to that close to a minimum. Indeed, if $\lambda$ is very large, then the matrix $\alpha'$ is essentially diagonal, so that Eq. (23) becomes $$a_k^{(n+1)} = a_k^{(n)} + \frac{\beta_k}{\alpha_{kk}\lambda}, \quad (24)$$

which is nothing but Eq. (10) with the stepping constant $1/(\alpha_{kk}\lambda)$, which is small since $\lambda$ is large. Conversely, when $\lambda$ is very small, then the matrix $\alpha'$ reduces to $\alpha$, and Eq. (23) is identical to Eq. (17). Because it covers both regimes depending on the value of $\lambda$, Eq. (23) is used in the iterative procedure to find the minimum of chi-square.

Finally, it can be shown that once the minimum of $\chi^2$ is found, $\alpha^{-1}$ is the covariance matrix of the parameters. In particular, the standard deviations of the estimates are given by the diagonal elements of $\alpha^{-1}$:

$$\sigma^2(a_j) = (\alpha^{-1})_{jj}. \quad (25)$$

The following algorithm is used to minimize the chi-square in order to find the best-fit parameters.

1. Start from some initial guess for the parameters $a_1, \ldots, a_M$.
2. Calculate $\chi^2(a_1, \ldots, a_M)$.
3. Pick $\lambda$ small, say $\lambda = 0.001$.
4. Form the matricies $\alpha'$ and $\beta$ and calculate the next guess $a^{(n+1)}$ using Eq. (23).
5. If $\chi^2(a^{(n+1)}) \geq \chi^2(a^{(n)})$, decrease $\lambda$ by 10 and return to step 4. (In other words, we are far from a minimum and we must follow the gradient while taking smaller steps.)
6. If $\chi^2(a^{(n+1)}) < \chi^2(a^{(n)})$ (i.e. we are getting close to the minimum), decrease $\lambda$ by 10 and update the solution: $a^{(n)} \rightarrow a^{(n+1)}$. Return to step 4.
7. Stop when $\chi^2$ changes by less than 0.001.

Once the best-fit parameters have been found, it is always a good idea to calculate the probability Q given by Eq. (7) to make sure that the fit is a good one.

We now describe how the parameter-fitting method detailed above is employed to identify the position of the touch event in the one or more embodiments of the touch sensitive displays discussed above. For pedagogical reasons, we will start by describing an over-simplified model that illustrates the workings of the algorithm, and we will show that this technique performs better than simpler algebraic formulas. Then we will describe a more practical model.

In order to apply the general machinery described above, one should specify a model for the data. This is where insight about the physical system under consideration comes into play. One can include various refinements into the model in order to describe reality with the desired level of accuracy. In this section we will start with the simplest model possible, one in which the amplitude reaching the detectors varies as the inverse of the distance to the touch event. This model is reasonable because the amplitude of the light scattered by a finger touching the surface into the planar waveguide decreases as $1/r$. However, this description is significantly simplified because it assumes that the signal level is known and constant, that the light is not attenuated as it propagates through the glass, and neglects the angular dependence of response of the detectors. Nevertheless, this model makes a good starting point in order to become familiar with the algorithm.

Therefore in this section we will assume that the response of detector i is given by $$f_i = \frac{1}{R_i}, \quad (26)$$

with the distance between the touch event and the detector is $$R_i = \sqrt{(x-x_i)^2 + (y-y_i)^2}, \quad (27)$$

Here, x and y are the unknown coordinates of the touch event, and $x_i$ and $y_i$ are the known positions of each detector.

The chi-square, function of the unknown parameters x and y, is given by $$\chi^2(x, y) = \sum_{i=1}^{N} \left[ \frac{\tilde{f}_i - f_i(x, y)}{\sigma_i} \right]^2, \quad (28)$$

where $\tilde{f}_i$ are the measured signals from each of the N detectors.

In order to construct the matrices $\alpha$ and $\beta$ required to minimize the chi-square, we must calculate the derivatives of $f_i$:

$$\frac{\partial f_i}{\partial x} = -\frac{x - x_i}{R_i^3} \quad (29)$$

$$\frac{\partial f_i}{\partial y} = -\frac{y - y_i}{R_i^3}. \quad (30)$$

the matrix elements are obtained from Eqs. (18) and (20). We write them down explicitely for clarity:

$$\beta_x = \sum_{i=1}^{N} \frac{1}{\sigma_i^2} \left( \tilde{f}_i - f_i \right) \frac{\partial f_i}{\partial x}, \quad (31)$$

$$\beta_y = \sum_{i=1}^{N} \frac{1}{\sigma_i^2} \left( \tilde{f}_i - f_i \right) \frac{\partial f_i}{\partial y}, \quad (32)$$

from which we construct $$\beta = \begin{bmatrix} \beta_x \\ \beta_y \end{bmatrix}. \quad (33)$$

Similarly, $$\alpha_{xx} = \sum_{i=1}^{N} \frac{1}{\sigma_i^2} \left( \frac{\partial f_i}{\partial x} \right)^2, \quad (34)$$

$$\alpha_{xy} = \sum_{i=1}^{N} \frac{1}{\sigma_i^2} \frac{\partial f_i}{\partial x} \frac{\partial f_i}{\partial y}, \quad (35)$$

$$\alpha_{yx} = \sum_{i=1}^{N} \frac{1}{\sigma_i^2} \frac{\partial f_i}{\partial x} \frac{\partial f_i}{\partial y}, \quad (36)$$

$$\alpha_{yy} = \sum_{i=1}^{N} \frac{1}{\sigma_i^2} \left( \frac{\partial f_i}{\partial y} \right)^2, \quad (37)$$

which are used to form the matrices $$\alpha = \begin{bmatrix} \alpha_{xx} & \alpha_{xy} \\ \alpha_{yx} & \alpha_{yy} \end{bmatrix} \quad (38)$$

and $$\alpha' = \begin{bmatrix} \alpha_{xx}(1+\lambda) & \alpha_{xy} \\ \alpha_{yx} & \alpha_{yy}(1+\lambda) \end{bmatrix}. \quad (39)$$

The vector containing the unknown parameters, a=[x,y]', is then obtained iteratively following the procedure detailed in section 2.5.

Once the solution is obtained, the errors on the position is given by the standard deviations $$\sigma_x^2 = (\alpha^{-1})_{xx} \quad (40)$$

$$\sigma_y^2 = (\alpha^{-1})_{yy}. \quad (41)$$

The progress of the chi-squared minimization algorithm is illustrated in FIGS. 1 and 2. The example used here is for a rectangular display with an aspect ratio of 2:1 and with 4 detectors located at the corners with coordinates $(x_i, y_i) = (\pm 1, \pm 0.5)$. Synthetic data was generated to simulate touch at a position $(x_0, y_0)$ using the formula $$\tilde{f}_i = \frac{1}{\sqrt{(x_0 - x_i)^2 + (y_0 - y_i)^2}}. \quad (42)$$

The chi-squared minimization process was carried out using the origin (x,y)=(0,0) as an initial guess. It has been demonstrated through modelling that a plot of $\chi^2(x,y)$ and the trajectory is followed by the algorithm. The minimum located at $(x_0, y_0)$ may be found after only a few iterations.

In general, it is not possible to find algebraic expressions for the position of the touch event in terms of the detector data. With a simple 1/r model, however, algebraic expressions do exist. It is interesting to see how the statistical approach compares with algebraic formulas in this case.

Algebraic formulas can be obtained by writing down the expression for $1/f_i^2$:

$$\frac{1}{f_i^2} = (x - x_i)^2 + (y - y_i)^2. \quad (43)$$

Taking a pair of detectors 1 and 2 and calculating the quantity $1/f_1^2 - 1/f_2^2$ leads to $$\frac{1}{f_1^2} - \frac{1}{f_2^2} = 2(x_2 - x_1)x + x_1^2 - x_2^2 + 2(y_2 - y_1)y + y_1^2 - y_2^2. \quad (44)$$

If we place these detectors such that $x_2 = -x_1$ and $y_2 = y_1$, then we can isolate the x coordinate:

$$x = \frac{f_1^{-2} - f_2^{-2}}{2(x_2 - x_1)}. \quad (45)$$

In a similar manner, the y coordinate can be isolated by taking two different detectors placed at $x_2 = x_1$ and $y_2 = -y_1$. Therefore, using 4 detectors placed symmetrically at the corners of a rectangle of width $w_x$ and height $w_y$, it is possible to extract the coordinates using the following formulas:

$$x = \frac{f_1^{-2} - f_2^{-2} + f_3^{-2} - f_4^{-2}}{4w_x} \quad (46)$$

$$y = \frac{f_1^{-2} + f_2^{-2} - f_3^{-2} - f_4^{-2}}{4w_y} \quad (47)$$

Let us put aside the fact that an algebraic solution does not necessarily exist for a more complicated model. In the absence of detector noise, the algebraic formulas give the position accurately and with very few operations. In this case there would be no need for a statistical approach. In the presence of detector noise, however, it is not clear which method is more accurate. A numerical experiment has been carried out to answer that question. A rectangular display with detectors at each of the 4 corners $(\pm 1, \pm 0.5)$ was assumed. Synthetic data was generated for a given touch position $(x_0, y_0)$, and gaussian noise was added to the value of each detector. Then the position of the touch event was recovered using both the statistical chi-squared minimization algorithm and the algebraic formulas. This procedure was repeated 100 times to obtain significant statistics. The standard deviations of the x and y coordinates obtained both ways were then calculated and compared. The entire procedure was then repeated for a different value of the touch position $(x_0, y_0)$.

In this example the noise added to the synthetic data was gaussian with a standard deviation of $\sigma_i = 0.05$. The results from the accuracy study compare the uncertainties of the recovered coordinates, $\sigma_x$ and $\sigma_y$, obtained with the algebraic and statistical method. (In the latter case, the standard deviations were obtained in two ways: from the analytical formulas Eqs. (40-41), and from the many statistical realizations.)

It was determined through experimentation that the statistical method was more accurate than the algebraic formulas. We also found that the standard deviations obtained from the multiple realizations were equal to those predicted theoretically, which reinforced confidence in the underlying theory.

The poor accuracy of the algebraic approach lies in the fact that the formulas use the square of the inverse of the experimental data, $f_i^{-2}$. For this reason, the strong signals, which we would expect to contain most of the information, have weak contributions. Conversely, the weak signals, which are most affected by noise, are the dominant contribution. This explains why the error on the position determined algebraically is larger than when it is obtained statistically.

In a group of experiments involving the using the fluorescence technique described above, the signal reaching the photodetectors obeys essentially the 1/r model described in the previous section. However, a number of important improvements had to be included.

First, it was found that attenuation of the light as it propagates by total internal reflection inside the glass needed to be taken into account. Therefore a factor of $\exp(-\alpha r)$ was included in the model. In a 1.1-mm-thick sheet of Gorilla glass, we estimated the value of the attenuation coefficient to be $\alpha \approx 7$ m$^{-1}$.

Second, we found that the response of the photodetectors dropped abruptly beyond 60° away from the normal direction. This was due to the design of the bezel, which included an O-ring in contact with the surface of the glass all along the edge in order to prevent stray light from hitting the detectors. While it caused only negligible loss in the normal direction, the O-ring caused significant attenuation for the light entering the bezel at large angles. The angular dependence of the detectors was accounted for by a super-gaussian transmission function of the form $\exp[-(\theta/\theta_{max})^m]$, with m an even integer. The values $\theta_{max} = 85°$ and $m = 6$ were found to provide reasonable agreement with the measured response profile.

Finally, the amount of scattered light is unknown and varies in time. So the model needs to include an overall unknown proportionality constant that is allowed to vary from one time step to the next.

In addition, the sensitivity of the detectors can vary slightly from one to the other. So the response of each detector needs to be multiplied by a known calibration factor, the value of which needs to be measured once and is assumed to stay constant thereafter.

Gathering all these contributions, the response of the photodetectors can be described by $$f_i(x, y, C) = CH_i g[R_i(x, y)] h[\theta_i(x, y)], \tag{48}$$
where $$g(R) = \frac{e^{-\alpha R}}{R}, \tag{49}$$

$$h(\theta) = e^{-(\theta/\theta_{max})^m} \tag{50}$$

and $H_i$ denotes the calibration constant. This model contains three unknowns parameters: the position (x,y) and the amplitude C. Although it is separable in R and $\theta$, there is no requirement that it be that way. The distance is given as usual by $$R_i = \sqrt{(x-x_i)^2 + (y-y_i)^2}. \tag{51}$$

The angle can be obtained by taking the vector product between the position vector and the normal to the edge of the sensor:

$$R_i \times n = zR_i \sin \theta_i. \tag{52}$$

Calculating the vector product, we find that $$\theta_i = \arcsin u_i, \tag{53}$$
where $$u_i = \frac{n_{iy}(x - x_i) - n_{ix}(y - y_i)}{R_i}, \tag{54}$$

and where $n_{ix}$ and $n_{iy}$ are the x- and y-components of the normal vector associated with detector i.

The calculation of the matrices $\alpha$ and $\beta$ required for the chi-square minimization algorithm require that we calculate the derivatives of $f_i$ with respect to its variable parameters. The derivative with respect to the amplitude C is straightforward:

$$\frac{\partial f_i}{\partial C} = H_i g(R_i) h(\theta_i). \tag{55}$$

Those with respect to the position variables are $$\frac{\partial f_i}{\partial x} = CH_i \left[ h(\theta_i) \frac{\partial g(R_i)}{\partial x} + g(R_i) \frac{dh(\theta_i)}{d\theta} \frac{\partial \theta_i}{\partial x} \right], \tag{56}$$
with $$\frac{\partial g(R_i)}{\partial x} = -g(R_i) \frac{(x - x_i)}{R_i^2}(1 + \alpha R_i), \tag{57}$$

$$\frac{dh(\theta_i)}{d\theta} = -m \frac{\theta^{m-1}}{\theta_{max}^m} h(\theta_i) \tag{58}$$
and $$\frac{\partial \theta_i}{\partial x} = \frac{-1}{R_i \sqrt{1 - u_i^2}} \left[ \frac{u_i(x - x_i)}{R_i} - n_{iy} \right]. \tag{59}$$

The derivatives with respect to y are similar, except for $\partial \theta_i / \partial y$, which contains a sign difference:

$$\frac{\partial \theta_i}{\partial y} = \frac{-1}{R_i \sqrt{1 - u_i^2}} \left[ \frac{u_i(y - y_i)}{R_i} + n_{ix} \right]. \tag{60}$$

The matrices α and β are then formed according to Eqs. (18) and (20) and following the procedure illustrated in section 3. It is worth noting that α is now a 3×3 matrix since there are 3 unknowns to solve for.

The position-detection algorithm described above is only one aspect of the program that manages the operation of the touch sensor. That program acquires the data generated by the controller board, checks for errors, performs data smoothing operations, monitors and updates the baseline level, calls the position-detection algorithm, decides whether the result passes quality tests, manages the history of the touch events entered by the user and displays the results on the screen. In this section we describe these tasks in more detail.

In our demonstration setup, the electrical signals generated by the photodiodes are processed by a controller board. Among its many functions, this controller generates the modulation signal that is used to drive the infrared backlight. The modulation, around 1 kHz, is required in order to eliminate the ambient light. The controller board receives the 10 signals from the photodiodes, amplifies each of them and performs synchronous detection by multiplying them by the modulation signal and integrating over many periods. Then it discretizes each channel using an analog-to-digital converter and sends the result through the serial port. This is the data stream that our Matlab program receives as an input.

The data is first smoothed to reduce the noise. Without this step, the noise is sufficiently large to cause jitter in the calculated position. The recursive time-domain filter used to smooth the data will be described in the next section.

When the program is started, the signal level is monitored for a short period of time (0.1 s) to acquire the baseline. This baseline is subtracted from the data and the result is the value that is passed to the position-detection algorithm. The baseline is updated frequently as the background level tends to drift, in particular due to dirt and fingerprints that accumulate over the surface of the touch screen. The baseline is adjusted so that it never exceeds the signal level and also whenever all signals remain constant for a sufficiently long period of time (typically, 0.5 s).

The position-detection algorithm is called as soon as one of the signals exceeds a certain threshold. How to pick the initial guess is an delicate issue as it can determine whether the algorithm converges or not. When the algorithm is called for the first time, many positions are tried successively and the result that best fits the data is retained. The initial guess for the signal amplitude is estimated using the signal levels. When the algorithm is called subsequently, the results from the previous time step are used as the initial guess for the next time step.

After a position is returned by the algorithm, it must pass a number of quality tests. First, the signal amplitude (the parameter C) must be above a certain threshold. This is necessary in order to identify the end of a touch event. Second, the uncertainty on the position (in terms of the standard deviations $\sigma_x$ and $\sigma_y$) must be below a certain value. This ensures that only positions that have been determined with reasonable confidence are retained. Third, a data point is rejected if it "jumps" too far from the previous value. This prevents unphysically fast displacements that tend to occur at the beginning and end of a touch event, when the signals increase from or decrease to weak values.

Finally, the program keeps track of the history of the session. Continuous traces are identified as such and displayed as continuous lines on the screen. A rudimentary "Paint" program allows users to see on the screen what they draw on the surface of the glass.

It was mentioned previously that the signals coming from the controller board is smoothed before being fed to the position-finding algorithm in order to reduce the jitter due to the noise. This step is carried out in the time domain using a recursive linear filter (also called "infinite impulse response filter"). In this section we give an overview of the theory for completeness.

Suppose that we have a stream of noisy data from which we want to construct a smoothed version in real time, as soon as the data becomes available. The information that is available is the set of all noisy and smoothed values that have become available so far. The process used to construct the smoothed data is described by the general linear filter $$y_n = \sum_{k=0}^{M} c_k x_{n-k} + \sum_{j=0}^{N-1} d_j y_{n-j-1}, \tag{61}$$

where $x_n$ denotes the original, noisy data and $y_n$ is the smoothed data. The goal is to determine the values of the coefficients $c_k$ and $d_j$ that will produce the desired filter. We relate this time-domain process to a filter defined in the frequency domain using a harmonic signal as the input and making sure that the output satisfies the desired filter. We assume harmonic signals, $$x_k = x_0 e^{2\pi i k f \Delta} \tag{62}$$

$$y_k = y_0 e^{2\pi i k f \Delta}, \tag{63}$$

with amplitudes $x_0$ and $y_0$ and period 1/f. Here, Δ denotes the sampling rate. Substituting into (61), we find a relationship between the coefficients $c_k$ and $d_j$ and the desired filter function, H(f):

$$H(f) = \frac{y_0}{x_0} = \frac{\sum_{k=0}^{M} c_k e^{-2\pi i f \Delta k}}{1 - \sum_{j=0}^{N-1} d_j e^{-2\pi i f \Delta (j+1)}}. \tag{64}$$

It is convenient to introduce $z = e^{2\pi i f \Delta}$. Then the filter can be rewritten as $$H(f) = \frac{y_0}{x_0} = \frac{\sum_{k=0}^{M} c_k z^{-k}}{1 - \sum_{j=0}^{N-1} d_j z^{-(j+1)}}. \tag{65}$$

If all $d_j$'s are zero, then the filter is non-recursive as it does not depend on previous values of the smoothed data. Such filters are always stable. If at least one $d_j$ is non-zero, then the filter is recursive. Typically, recursive filters perform better, but they can be unstable. The condition of stability is that all roots of the characteristic equation $$z^N - \sum_{j=0}^{N-1} d_j z^{N-j-1} = 0 \tag{66}$$

must lie in the unit circle.

A procedure to construct a filter that has the desired filter function and at the same time satisfies the stability condition is outlined later in this description. The idea is to use a change of variables that makes it easy to identify whether a filter function is stable or not. To this end, we introduce $$w \equiv \tan(\pi f \Delta) = \frac{e^{i\pi f\Delta} - e^{-i\pi f\Delta}}{i(e^{i\pi f\Delta} - e^{-i\pi f\Delta})} = i\left(\frac{1-z}{1+z}\right). \quad (67)$$

This change of variables maps the inside of the unit circle (the region of stability) to the upper half complex plane. So, in terms of w, the zeros of the characteristic equation (66) must lie in the upper half plane to ensure stability.

As an example, consider the following: A simple low-pass filter is $$|H(f)|^2 = \frac{b^2}{w^2 + b^2}, \quad (68)$$

where b is related to the cut-off frequency. Then the amplitude of the response is $$|H(f)| = \frac{b}{\sqrt{w^2 + b^2}}. \quad (69)$$

To determine where are the poles of H are, we simply factorize the denominator of the filter function:

$$|H(f)|^2 = \frac{b^2}{(w+ib)(w-ib)}. \quad (70)$$

The poles of H are at $\pm ib$, but as we know by now, only $+ib$ corresponds to a stable filter. So we keep only that factor in the expression for H(f):

$$H(f) = \frac{-ib}{w - ib}. \quad (71)$$

One can verify that this expression satisfies the amplitude given by Eq. (69). The factor of $-i$ was included to obtain the desired phase response (that is, zero phase shift at f=0). Using Eq. (67), the filter function can be written in terms of powers of $z^{-1}$:

$$H(f) = \frac{\frac{b}{1+b} + \left(\frac{b}{1+b}\right)z^{-1}}{1 - \left(\frac{1-b}{1+b}\right)z^{-1}}. \quad (72)$$

By comparing with the general expression of a recursive filter, Eq. (65), we can simply read off the filter coefficients:

$$c_0 = \frac{b}{1+b} \quad (73)$$

$$c_1 = \frac{b}{1+b} \quad (74)$$

$$d_0 = \frac{1-b}{1+b}. \quad (75)$$

This simple filter only goes back one time step.

The filter described so far is not a very good filter, as its cut-off is very slow. A filter with a more abrupt cut-off is obtained by using a slightly more complicated filter function:

$$|H(f)|^2 = \frac{b^4}{w^4 + b^4}. \quad (76)$$

Its amplitude response is $$|H(f)| = \frac{b^2}{\sqrt{w^4 + b^4}}. \quad (77)$$

There are now four poles, located at $e^{i\pi/4}b$, $e^{3i\pi/4}b$, $e^{5i\pi/4}b$ and $e^{7i\pi/4}b$. Only the first two are located in the upper half-plane and satisfy the stability condition, so they are the only factors that we keep:

$$H(f) = \frac{e^{i\phi}b^2}{(w - e^{i\pi/4}b)(w - e^{3i\pi/4}b)}, \quad (78)$$

where $\phi$ is a phase factor that we later determine to be $\pi$. Substituting for z, the filter can be rewritten into the standard form of Eq. (65). After some tedious algebra, we find that the recursion coefficients are $$c_0 = \frac{b^2}{b^2 + \sqrt{2}b + 1} \quad (79)$$

$$c_1 = \frac{2b^2}{b^2 + \sqrt{2}b + 1} \quad (80)$$

$$c_2 = \frac{b^2}{b^2 + \sqrt{2}b + 1} \quad (81)$$

$$d_0 = \frac{2(1 - b^2)}{b^2 + \sqrt{2}b + 1} \quad (82)$$

$$d_1 = \frac{-(b^2 - \sqrt{2}b + 1)}{b^2 + \sqrt{2}b + 1}. \quad (83)$$

This filter goes back two time steps. Because of its sharper cut-off, this filter is the one that is implemented in the Light-Touch prototype. We find that using a cut-off parameter b=0.3 gives adequate noise reduction.

Example

Code Modulation Implementation

As discussed above, the driver circuit 144 may modulate one or more of the sources 110 such that the respective light therefrom includes a certain code or codes, such as orthogonal codes, like well known Walsh codes. For the purposes of discussion, this section provides a detailed description of an implementation of a modulator and demodulator circuit suitable for carrying out code modulation to eliminate cross-talk between four simultaneous sources of light energy from the sources 110.

Figure 9:
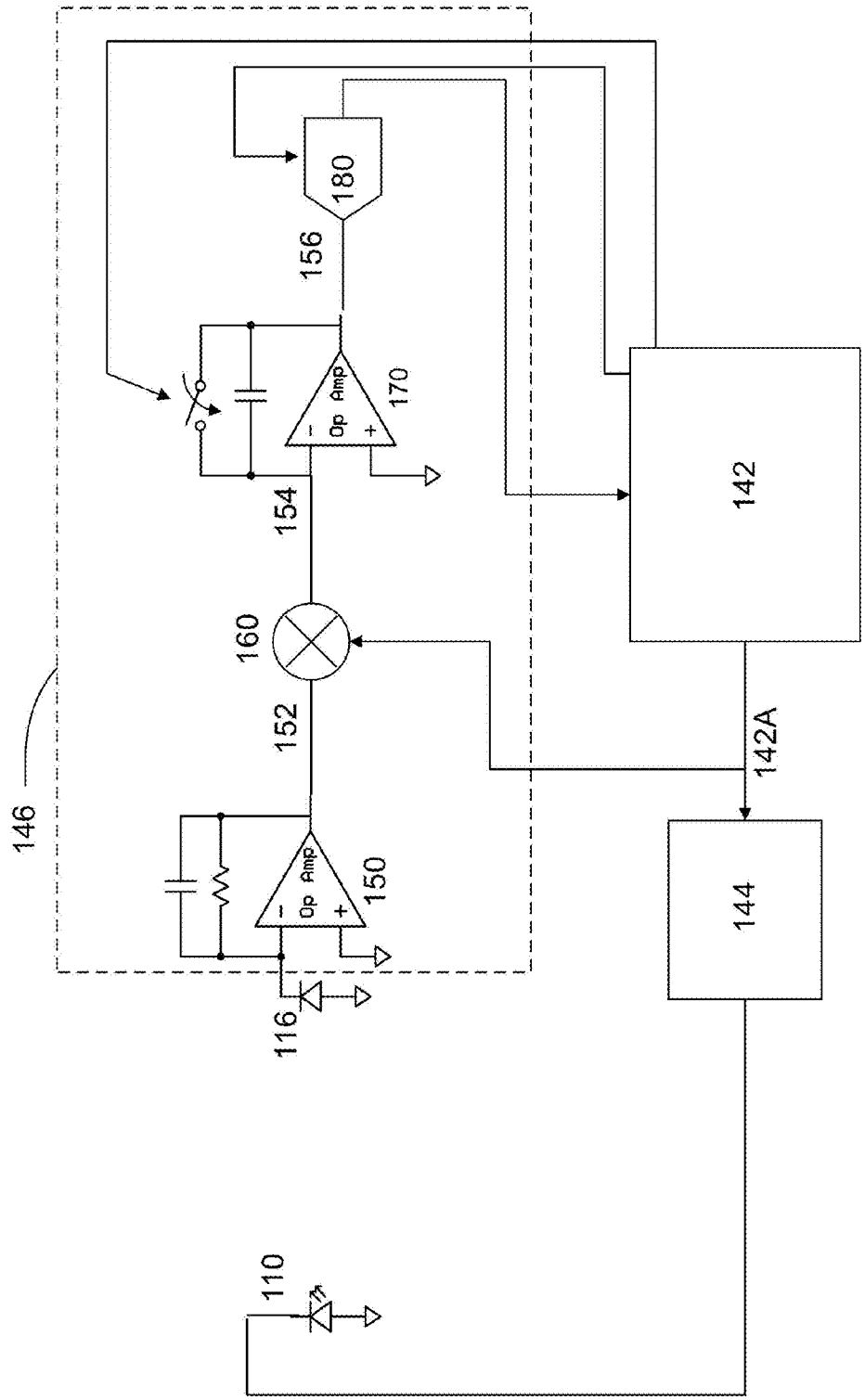
FIG. 9 is a block diagram of a code modulator and demodulator circuit suitable for use with one or more of the embodiments herein.

With reference to FIG. 9, a block diagram of a circuit is illustrated, which is suitable for providing the aforementioned code modulation and demodulation. Notably, the same general circuit topology may be used to implement any of the modulation embodiments discussed above (including frequency modulation), although there would be some firmware changes and software changes to implement different modulation schemes.

A single receiver channel is shown with a single LED source 110 for simplicity, it being noted that multiple sources 110 would be employed. The circuit may be employed for both phase-sensitive detection and specific pseudo-random codes. In phase-sensitive detection mode, the microprocessor 142 generates a bipolar (+/−1) square wave burst on line 142A to the driver circuit 144. The square wave frequency is somewhat arbitrary, although it should be high enough to be above the 1/f noise of the preamplifier 150 but low enough to be within the bandwidth limitations of most low-cost, low-noise operational amplifiers. In addition, the frequency of the square wave burst should not be at a harmonic of the 60 Hz power frequency. A frequency of about 1 kHz works well. The number of cycles in the square wave burst depends on many factors, but in order to measure at a 50 Hz rate to comply with Microsoft's Windows 7 standard, 20 cycles (corresponding to 20 ms) to complete the entire sequence works well. The source 110 is driven by the same square wave burst waveform; however, the sources 110 are switched on only during the positive half-cycle of the square wave.

The touch signal will be synchronous with the source 110 output, generating a square wave photocurrent in the light sensing element 116 (such as a photodiode). The photocurrent is converted to a voltage by the transimpedance preamplifier 150.

The pre-amplifier signal voltage output on line 152 is multiplied by a bipolar code in the multiplier block 160 to produce a product of such signal (line 152) and the code on line 154. Once the code burst is complete, the microprocessor 142 commands the analog to digital converter 180 to sample and digitize the output of the integrator 170 followed a command to reset the integrator 170 by closing the dump switch. The value of the multiplier block 160 is chosen such that for a constant background signal, after multiplication by the bipolar code, one arrives at a bipolar output signal on line 156 and an integration of the bipolar background signal leads of exactly zero. This results in synchronous detection while suppressing background light. There are benefits beyond background suppression. Synchronous detection acts like a narrowband filter centered at the square wave frequency and with bandwidth approximately equal to 1/T, where T is the length of the square wave burst or integration time. Making the integration time longer reduces the detection bandwidth and with it the noise.

The digitized signals (line 156) from all of the light sensing elements 116 are collected by the microprocessor 142, which then computes the touch position using the algorithms discussed in detail above.

As an alternative to using a bipolar square wave burst signal as the code, there are other interesting choices. In order to implement an optical receiver that senses light from some sources 110 and not others, Walsh codes may be employed, a class of pseudo-noise codes (which are used in CDMA cell phone networks). Walsh codes are easily constructed in lengths that are a power of 2. For other lengths, such as a 20-bit sequence, one uses the rows of the well-known Hadamard matrices. One of the order 20 Hadamard matrices is listed below.

```
+----+----++--++-++-
-+----+---+++----+-++
--+----+---+++-+-+-+
---+----+---+++++-+-
----+----++--++-++-+
-++++-----+---+++--+
+-+++-+----+-+---+++--
++-++---+----+-+---+++-
+++-+----+---+-+---+++
++++------++-+-+----++
--++-+-++-+-----+++
---++-+-++-+----+-+++
+---++-+-+---+---+-+++
++---++-+----+-+++-+
-++---++-+----++++-
-+--+---++-+----+----
+-+------++-+-----+---
-+-+-+---+---+----+--
--+-+++--------+----+-
+--+--++-------+----+
```

Each of the + and − signs represents the +1 and −1 values of the bipolar sequence. Note that the codes are balanced. That is, there are equal numbers of 1s and −1s so that the sum of each row is zero. Thus, the integration of a constant background will be zero just like the aforementioned square wave code. An important property of these Hadamard sequences is that they are orthogonal. Thus, multiplying two different codes term by term and summing the results gives a zero result. It is this property that makes a receiver driven by one Hadamard code insensitive to signals modulated with a different Hadamard code.

Referring to the block diagram of FIG. 9, it is apparent that if we add a second source 110 modulated with the row 1 Hadamard code, while the multiplier 160 is driven by the row 2 code, then the output of the integrator 170 is zero because the circuit performs the same operation as described above.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

The invention claimed is:

1. A touch sensitive display, comprising:
a display layer;
a transparent layer disposed over the display layer, wherein the transparent layer comprises a top surface and a bottom surface that are approximately parallel, and at least four edge surfaces;
at least one source adjacent to each edge surface directing light to propagate into and through a majority of the transparent layer via the edge surface of the transparent layer;

at least one light sensing element adjacent to each edge surface and in contact with the transparent layer and operating to receive scattered light in response to an object touching the top surface of the transparent layer and disturbing the propagation through the transparent layer of the light from a source adjacent to the same edge surface as the light sensing element; and a control circuit including a processor receiving signals from the at least one light sensing element indicative of the scattered light, and computing one or more positions at which the object touches the transparent layer wherein each edge surface of the transparent layer and at least part of the top surface and bottom surface of the transparent layer adjacent the edge surfaces comprises a light reduction mechanism.

2. The touch sensitive display of claim 1, wherein:
the at least one source adjacent to each edge surface is in communication with the transparent layer such that the light is coupled into the transparent layer and propagates in a guided mode; and
the object touching the transparent layer causes a discontinuity and disrupts the guided mode of the light, thereby producing the scattered light.

3. The touch sensitive display of claim 1, wherein:
the light emanating from each source adjacent to each edge surface includes at least one distinguishing characteristic such that the processor is operable to distinguish certain of the signals to be from scattered light produced in response to each source.

4. The touch sensitive display of claim 3, wherein the at least one distinguishing characteristic includes at least one of:
a differing wavelength of the light emanating from each source;
a temporal component whereby the light emanates from each source at differing times as compared to the light emanating from the other sources;
a modulation component whereby the light emanating from each source is modulated with a unique code; and
a further modulation component whereby the light emanating from each source is modulated with a unique frequency.

5. The touch sensitive display of claim 1, wherein the a light reduction mechanism comprises a low reflectance pigment disposed along an edge of the transparent layer.

6. The touch sensitive display of claim 5, further comprising:
at least one filter disposed between each source and the transparent layer, and operating to attenuate light.

7. The touch sensitive display of claim 6, wherein at least one filter includes an infrared filter operating to attenuate light in an infrared range of wavelengths.

8. The touch sensitive display of claim 4, wherein:
the control circuit includes a light source driving circuit operating to energize each source in time sequence; and
the processor computes the one or more positions at which the object touches the transparent layer based in part on distinguishing that certain of the signals are produced at certain times in response to light from a particular one or more of the light sensing elements, and certain others of the signals are produced at certain other times in response to light from a particular one or more others of the light sensing elements.

9. A method of using the display of claim 1, comprising:
directing light to propagate into and through the transparent layer;
measuring scattered light in response to an object touching a surface of the transparent layer and disturbing the propagation of the light therethrough; and
computing one or more positions at which the object touches the transparent layer based on signals obtained by the step of measuring the scattered light.

10. The method of claim 9, further comprising:
coupling the light into the transparent layer such that the light propagates therein in a guided mode; and
disrupting the guided mode of the light by touching the surface of the transparent layer.

11. The method of claim 9, further comprising:
directing the light into the transparent layer via at least one source in communication with each edge of the transparent layer;
including at least one distinguishing characteristic in the light emanating from each respective source; and
distinguishing, based upon the at least one distinguishing characteristic, that certain of the signals to be from scattered light produced in response to each respective source.

12. The method of claim 11, wherein the at least one distinguishing characteristic includes at least one of:
a differing wavelength of the light emanating from each source;
a temporal component whereby the light emanates from each source at differing times as compared to the light emanating from the other sources;
a modulation component whereby the light emanating from each source is modulated with a unique code; and
a further modulation component whereby the light emanating from each source is modulated with a unique frequency.

* * * * *